United States Patent [19]
Horne et al.

[11] Patent Number: 5,967,187
[45] Date of Patent: Oct. 19, 1999

[54] OSCILLATORY DUAL FLAP VALVE SYSTEM

[75] Inventors: Kenneth N. Horne; Mark H. Yim, both of Palo Alto, Calif.

[73] Assignee: Xerox Corporation, Stamford, Conn.

[21] Appl. No.: 08/995,110

[22] Filed: Dec. 19, 1997

[51] Int. Cl.$^6$ .................................................. F16K 11/044
[52] U.S. Cl. ..................................... 137/875; 251/129.01
[58] Field of Search .............................. 137/875, 625.44; 251/129.01

[56] References Cited

U.S. PATENT DOCUMENTS

| | | | |
|---|---|---|---|
| 2,330,151 | 9/1943 | Smith | 137/875 X |
| 2,777,251 | 1/1957 | Bailey | 137/875 X |
| 3,108,613 | 10/1963 | Bochan | 251/331 X |
| 3,266,512 | 8/1966 | Turick | 137/875 X |

OTHER PUBLICATIONS

IBM Technical Disclosure Bulletin, vol. 12 No. 12, May 1970.

*Primary Examiner*—John Fox

[57] ABSTRACT

A valve includes a valve chamber and at least two flaps capable of opening to provide an outlet for fluid or closure to block fluid flow. In or immediately adjacent to the valve chamber are catch mechanisms for controllably latching flap elements in an open or a closed position. In normal operation, the flaps open and close at a certain oscillation frequency in response to oscillatory fluid pressure differentials. Since the flap elements move, oscillations eventually bring the flap elements into catchment range of catch mechanisms capable of holding the flaps open or closed.

19 Claims, 16 Drawing Sheets

OSCILLATORY DUAL FLAP VALVE SYSTEM

This invention was made with United States Government support awarded by Defense Advanced Research Project Agency (DARPA) under Contract No. DABT63-95-C-0025. The United States Government has certain rights in this invention.

FIELD OF THE INVENTION

The present invention relates to oscillatory valves for controlling fluid flow. More particularly, the present invention relates to unstable oscillatory flap valves having electrically controlled latching mechanisms.

BACKGROUND AND SUMMARY OF THE INVENTION

Many applications require redirecting small volumes of fluid flow. For example, valved conduit systems are widely used for high pressure chemical processing, fluid injection systems, aerosol delivery, or gaseous fluid bed object support systems. The high velocity fluid flow may be internal (for example, a switching conduit system), or external (for example, a turbulence reduction system requiring opening or closure of microflaps in an airplane wing or body).

Traditionally, low power control of such systems is difficult because of the significant energy required to counter or redirect the flow during valve closure. Powerful electromagnetic or unwieldly mechanical systems were required to quickly redirect swiftly flowing air, water, or other fluid. Low power electrostatic valving systems, while often adequate for low velocity valving applications, were not sufficiently powerful for use in conjunction with certain flow regimes.

The present invention circumvents the high power requirements for directly opposing fluid flow by providing a low cost and practical mechanism for capturing a portion of the energy of the fluid flow, allowing consistent and reliable redirection of fluid flow. While still allowing the use of electromagnetic or mechanical valve control, the present invention advantageously allows for the use of low power electrostatic or electromagnetic control. The present invention includes a valve for redirecting fluid flow having a valve chamber supporting fluid flow, with the valve chamber having an inlet, a first outlet, and a second outlet. The valve chamber can be closed (e.g., a pipeline flow diverter or manifold) or partially open (e.g. for external applications such as airflow diversion on an airplane's wing). The flap element supported (by a flap support) at least partially in the valve chamber has a first and a second end, with the first end attached to the flap support and the second end extending into the valve chamber. The flap element is movable to alternatively block the first outlet and the second outlet (or additional outlets if present).

In or immediately adjacent to the valve chamber are opposing first and a second catch mechanisms for controllably latching the flap element to block respectively the first outlet and the second outlet. The first and second catch mechanisms respectively have a disabled state and an activated state for holding and allowing release of the flap element. Once the first or second catch mechanism is disabled, the flap element is free to move to another position. The present invention provides an impulse mechanism for kicking the flap element into the valve chamber away from one of the first and second catch mechanisms after one of the first and second catch mechanisms is controllably brought into the disabled state. Since the flap element is unstable when unlatched during typical fluid flow conditions, oscillations of the flap element in the fluid flow will eventually bring the flap element into catchment range of one of the first and second catch mechanisms in an activated state. The impulse mechanism can arise from Bernoulli forces exerted on a flexible flap element that induce fluttering oscillations lifting the flap, or can include mechanical, electromechanical, or electromagnetic forces such as may be applied by electrically activated shape memory metals, piezoreactive ceramics, or magnetic materials.

The catch mechanism can include a first electrostatic plate separated from the flap element by a first dielectric, with an electric charging unit connected to at least one of the flap element and the electrostatic plate to apply a voltage differential for electrostatically attracting and holding the flap element to block the first outlet in the activated state. Alternatively, an electromagnet attached to either (or both) the valve chamber or the flap element to electromagnetically hold the flap element to block the first outlet in the activated state can be used, as can a releasable electromechanical latch attached to either (or both) of the valve chamber and the flap element to mechanically hold the flap element to block the first outlet in the activated state, and allow disengagement when disabled.

In certain embodiments the flap element is substantially flexible along its length. Such a flexible flap element can be attached to the flap support like a reed of a musical instrument so that it trails (with respect to oncoming fluid flow) the second end extending into the valve chamber. Alternatively, the second end extending into the valve chamber can be arranged to trail the first end attached to the flap support, so that it flutters like a flag with respect to oncoming fluid flow.

In one particularly favored embodiment, the flap element is attached to the flap support. The flap element also has a hinged flap, vane, rudder, or other projectible element attached to it by a hinge joint, with the hinged flap being movable into fluid flow by the impulse mechanism. Once even slightly raised into the fluid flow, the hinged flap utilizes the energy of the fluid flow to further raise itself into the fluid flow, eventually leading to capture by the opposing catch mechanism (and rediversion of the fluid flow).

Since the present invention relies on the use of an unstable closure element (such as the foregoing flexible flap element) to redirect fluid flow in two or more directions, it can be very power efficient, with very small initial forces being amplified by the fluid flow into large movements of the flap element. As will be appreciated, with suitable modifications, valves in accordance with the present invention can use substantially flat flap elements, projecting flaps or vanes, three dimensional (e.g. airfoil geometries), cylindrically mounted flaps, screws, rotary vanes, or any other suitable shape suitable for controllably redirecting air flow. As will be apparent from consideration of the present disclosure, redirection of fluid doesn't even require closed conduits or chambers, but may be practiced in conjunction with partially open chambers having flaps extendible into external air flows over airplane wings or other structures exposed to high velocity fluid flows.

A particularly preferred embodiment of the present invention provides for valves embedded or attached immediately adjacent to conduits, passageways, or apertures defined in or supported by the laminate. Large scale arrays of valves for controlling fluid flow can be easily connected to centralized or distributed controllers by the photolithographically formed metallic electrical connections. In conjunction with appropriate sensors and fluid pressure sources, these arrays can be used to precisely control fluid flow, for dynamic control of fluid instabilities, for supporting movable objects such as paper, or for injecting electrical charge, dyes, inks, or chemicals into chambers or conduit systems.

As will be appreciated by those skilled in the art, large arrays of valves in accordance with the present invention have particular utility in conjunction with an object transport device or other material processing system that must precisely control position and velocity of paper or other objects moving through the system. Such a system is disclosed, for example, in U.S. Pat. No. 5,634,636, assigned to Xerox Corp., the disclosure of which is hereby expressly incorporated by reference. While the use of air jet mechanisms for support of solid objects is generally straightforward, accurately supporting flexible objects such as continuous rolls of paper, sheets of paper, extruded plastics, metallic foils, wires, or optical fibers is much more difficult. In such systems, the flexure modes can result in complex object behavior that may require constant high speed switching of numerous valved high velocity air jets. Unlike rigid objects, flexible objects are dynamically unstable when supported by air jets, with edge curl, flutter, or other undesirable dynamic movements continuously occurring during support and transport. Such undesirable movements of the flexible object can result in mispositioning, transport failure, or even damaging surface contact between the flexible object and an air jet conveyor.

Accordingly, the present invention provides novel valve structures for use in a fluid transport apparatus. The valves of the present invention can effectively work with either continuous or discrete flexible objects moving through a materials processing system. In a most preferred embodiment of the present invention, paper or other graphically markable material is among the flexible objects capable of being controlled by an array of unstable flap valves in accordance with the present invention. A paper handling system includes a plurality of valved air jets adjusted for transport of paper, with at least a portion of the plurality of air jets being individually controllable. A sensing array continuously (or intermittently) determines paper position, and an air jet control unit connected to the sensing array is configured to modify paper trajectory in response to information received from the sensing array. In response to the calculated position, the air jet control unit modifies paper movement or orientation (for example, by selectively increasing or decreasing air flow from air jets that impart momentum to defined subregions of the paper) to nearly instantaneously correct for discrepancies in the motion state of the paper, including its position, orientation, trajectory, velocity, flexure, or curvature. In preferred embodiments, the plurality of valved air jets can be used to apply tensile or compressive forces to flatten paper, and the air jet control unit can be used to maintain paper in this flattened position during transport. Of course, other paper positions (in addition to flat) can also be maintained, with, for example, the plurality of opposed air jets being used to generate sufficient force to curve selected subregions of the paper.

Additional functions, objects, advantages, and features of the present invention will become apparent from consideration of the following description and drawings of preferred embodiments.

DETAILED DESCRIPTION OF THE INVENTION

Figure 1:
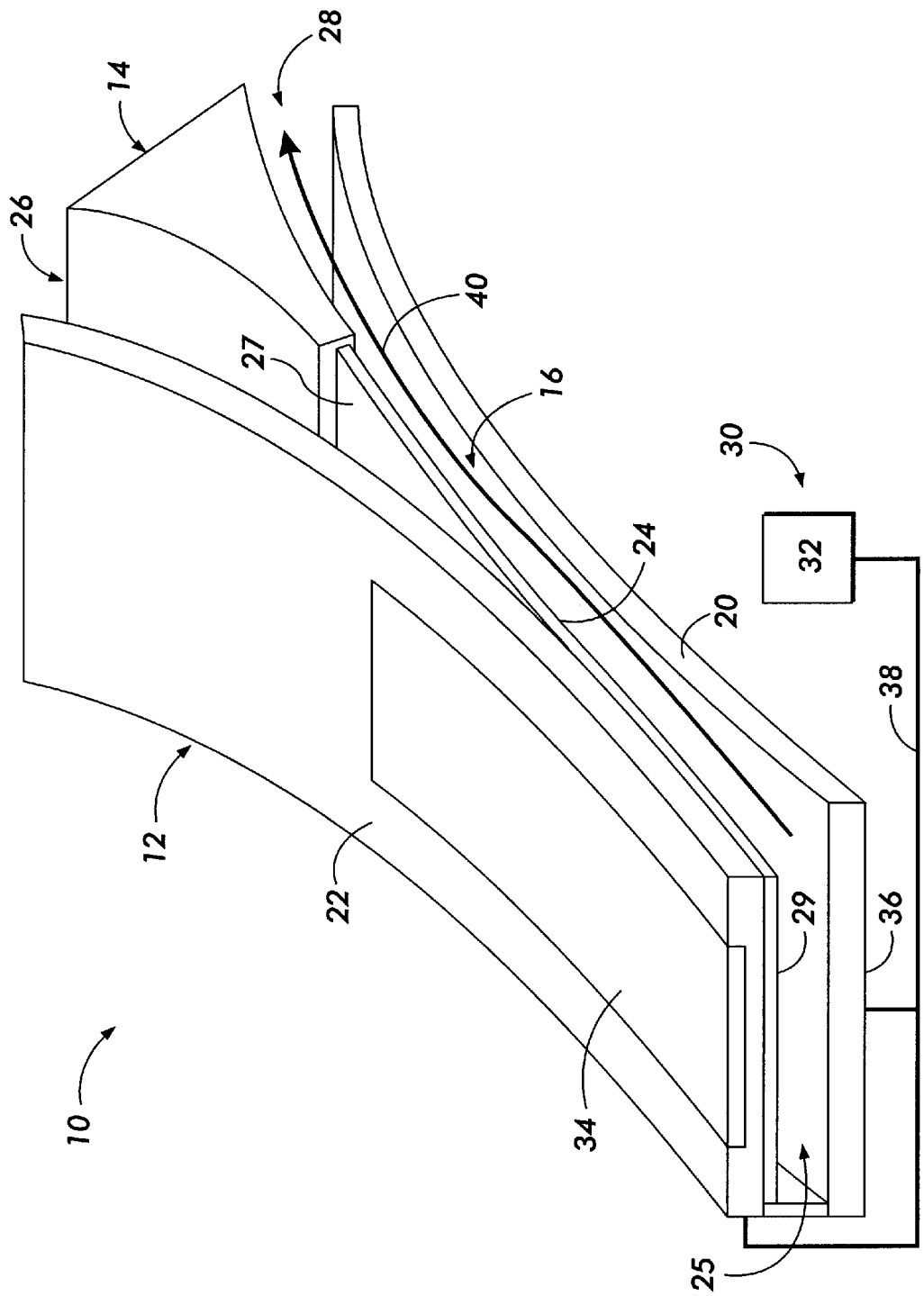
FIG. 1 is a schematic, partially broken away view of an unstable flap valve.

FIG. 1 is a schematic, partially broken away view of an unstable flap valve system 10 for redirecting fluid flow. The valve system 10 includes a valve body 12 formed to define an inlet 25 for flowing fluid (indicated by streamline arrow 40) into a valve chamber 16 situated between valve walls 20 and 22. A fluid diverter element 14 is positioned opposite inlet 25 between valve walls 20 and 22 to define respective first outlet 26 and second outlet 28 from the valve chamber 16. A flap element 24 is fixedly attached at a supporting end 27 to fluid diverter element 14, with a free end 29 of flap element 24 directed to movably extend at least partially into valve chamber 16. The flap element 24 is movable to alternatively block the first outlet 26 and the second outlet 28. Positioned immediately adjacent to the valve chamber 16 are opposing first and second electrically connected plates 34 and 36. The electrically connected plates 34 and 36 may generate either electrostatic or electromagnetic forces, and function as a catch mechanism for controllably latching the flap element 24 to alternatively block fluid flow through either the first outlet 26 or the second outlet 28. Electrical control is maintained through control leads 38 electrically connected between the plates 34 and 36 and a control unit 32. In FIG. 1, plate 34 is a charged electrostatic plate separated by an insulative dielectric from free end 29 of flap element 24, effectively pinning the free end 29 adjacent to plate 34 with low power electrostatic forces.

As will be appreciated by those skilled in the art, various materials and techniques can be used to construct an unstable flap valve system 10. For example, the valve body 12 can be constructed from molded, extruded, etched, cut, stamped, formed, lathed, ground, or drilled plastic or metal pieces. In certain embodiments of the invention, construction from various drilled or etched laminates is contemplated. This can include fiberglass or impregnated epoxies such as used in conventional printed circuit board manufacturing. In addition, unitary construction of multiple described elements in the foregoing valve system (e.g. unitary sidewalls or extrusion flaps) is within the scope of the invention.

With suitable modification, valves can be constructed to have multiple inlets, multiple outlets, or even define complex manifolds. Multiple flap elements can optionally be used to cover multiple outlets, while flow volumes may be precisely controlled through the use of multiple outlets (that allow greater or lesser numbers of outlets to be selectively blocked) feeding back into a single final outlet.

A great variety of flap element designs is also possible, with some flap elements being substantially flexible along their length, some having graded flexibility, some being partially flexible over some portion of their length, or even some having alternating rigid and flexible segments. In certain embodiments, the flap element can be substantially rigid for at least a portion of its length, with optional hinge joints allowing a limited flexibility. Plastics, laminates, or resilient metals can be used for construction of flap elements. The flap element can be of unitary construction (e.g. a homogeneous, constant thickness, rectangular plastic strip), or can be hinged, pinned or constructed from various diverse materials. In certain embodiments, ferroelectric materials, inscribed planar electromagnetic coils, or other mechanism for inducing or generating electromagnetic forces to aid a catch mechanism can be used in conjunction with the flap. Flaps are not limited to thin, rectangular, planar construction of unvarying dimensions as illustrated in FIG. 1, but can have various polygonal, arcuate, ovoid, or irregular shapes as required. In addition, the thickness or cross section of a flap need not be constant, but may optionally have triangular, diamond, irregular, or other suitable cross sections. Such complex flap elements having multiple fluid blocking surfaces may be of special use in connection with more complex manifold valve designs.

Electromagnetic or electrostatic controls are generally used to catch the flap in a closed (or open) position. The catch mechanism generally includes an electrostatic plate separated from the flap element by a first dielectric or insulator (such as an epoxy laminate, plastic coating, or insulative element), with an electric charging unit connected to either the flap element or the electrostatic plate to apply a voltage differential for electrostatically attracting and holding. Alternatively, an electromagnet attached to either (or both) the valve chamber or the flap element to electromagnetically hold the flap element to block the first outlet in the activated state can be used, as can releasable electromechanical latches attached to either (or both) of the valve chamber and the flap element to mechanically hold the flap element to block the first outlet in the activated state, and allow disengagement when disabled. In certain embodiments, fluid pressure differentials can even be used to assist in pinning (by suction) a flap element to a sidewall. As will be appreciated, such various mechanical, pressure, electrostatic, or electromagnetic catch mechanisms suitable for use in conjunction with the present invention can be used alone or in combination.

The control unit 32 typically modifies voltage supplied to plates 34 and 36. Voltage changes can enable or disable any provided electrostatic, electromagnetic, or electromechanical catch mechanisms. In certain embodiments the control unit can be integrated with the valve 12, or can alternatively be situated at a remote location. Although a single control unit 32 is indicated in FIG. 1, it will be understood that multiple controllers may be used. In addition, while controllers can be conventional system specific embedded analog or digital controllers, it is contemplated to use sensor/controller systems directed by multipurpose digital computers. Programmable computer control of large arrays of pressure sensors and individual voltage control units is contemplated to be of particular utility in conjunction with airbed systems or fluid injection systems (e.g. such as may be used for providing chemical additives or ink/toner printers).

As will be appreciated, control or redirection of fluid flow in accordance with the present invention encompasses a wide variety of fluids, fluid flow regimes, and fluid mixtures, additives, or suspensions. Fluid can be gaseous or liquid (e.g. air, nitrogen, carbon dioxide are suitable gas or gas mixtures, while water or petroleum derivatives are common liquids), and can include suspended or entrained solid particles, bubbles, micelles or other non-homogenous or phase partitioned additives to a liquid or gas. Accordingly, in addition to pure liquids or gases, the present invention allows for slurries, aerosols, or even electric charge bearing elements to be valve controlled or redirected. As will be appreciated, various fluid reservoirs connecting to valves in accordance with present invention, including pressure chambers, compressors, pumps, or other fluid containing devices known to those skilled in the art, can be employed.

Valves in accordance with the present invention can be used both to internally redirect, block, or limit fluid flow, or can be used to redirect external fluid flow around an object immersed or supported in a fluid medium. For example, internal embodiments of the present invention may have applications as high speed air or fluid valves for the chemical or petrochemical industry, as valved injectors for suspended droplets or solids in a liquid or gas, or even for pressure control of electromechanical systems such as tactile actuators for user feedback. Applications for external fluid flow redirection are similarly broad, and may include fluid flow diversion in aerospace, marine, or externally exposed microelectromechanical devices.

Figure 2:
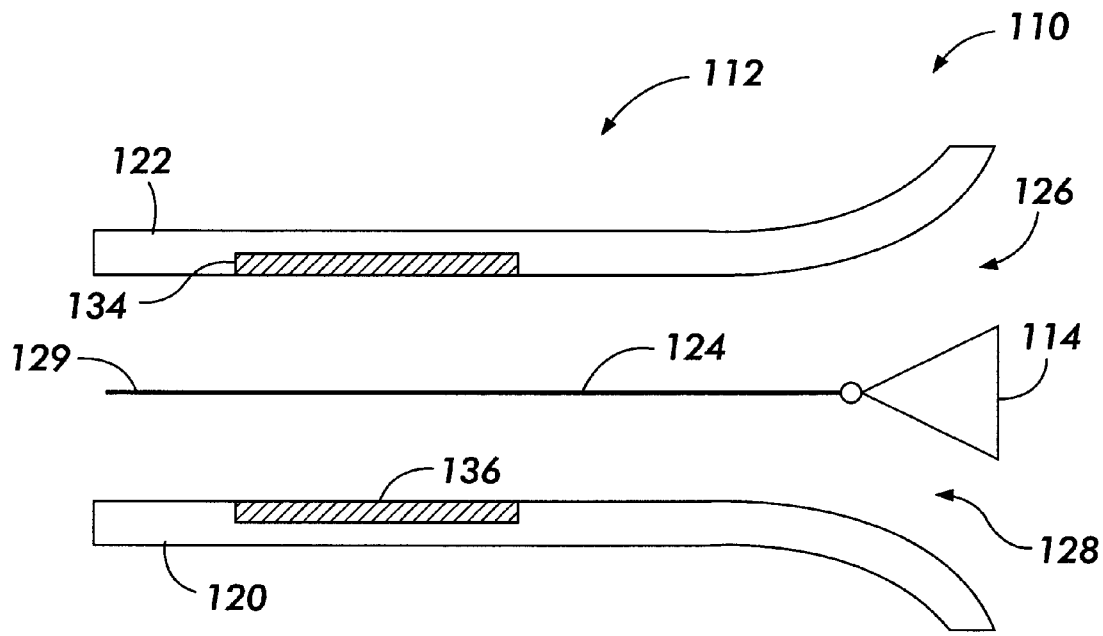
FIG. 2 is a schematic side view of a flap element similar to that illustrated in FIG. 1, situated in an unstable, non-blocking position.

Operation of an unstable flap valve system suitable for various applications is best illustrated with respect to FIGS. 2 through 5. FIG. 2 is a schematic side view of an unstable flap valve system 110 similar to system 10 that illustrated in perspective view in FIG. 1. As seen in FIG. 2, a flap element 124 (supported by fluid diverter 114) is positioned in an unstable, non-blocking position in a valve body 112, with free end 129 of the flap element 124 extending into valve chamber 116. The flap element 124 is constructed from a substantially flat, flexible plastic material to be movable to alternatively block a first outlet 126 and a second outlet 128. Opposing first and second electrically connected plates 134 and 136 are configured to controllably generate electrostatic forces in response to an applied voltage, and function as a catch mechanism for controllably latching the flap element 124 to alternatively block fluid flow through either the first outlet 126 or the second outlet 128. In operation, the first and second plates 134 and 136 respectively have a disabled state and an activated state for holding and allowing release of the free end 129 of the flap element 124.

Figure 3:
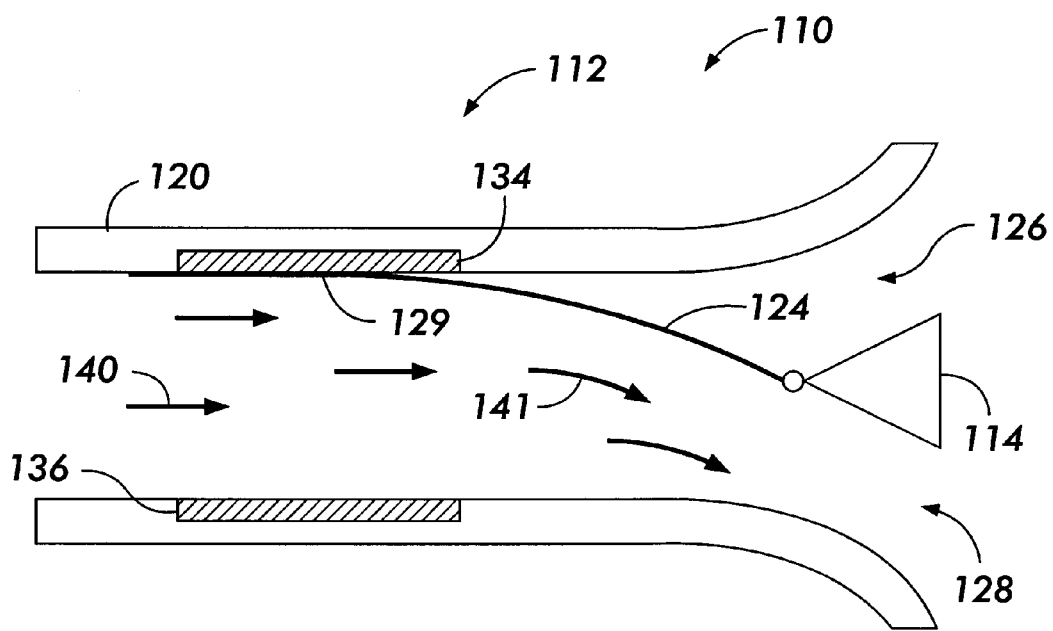
FIG. 3 is a schematic side view of the flap element of FIG. 2, with the flap element moved to block a first outlet and held in place by a first electrical catch mechanism.

In FIG. 3, plate 134 is in an enabled state to provide an electrostatic force sufficient to pin the flap element 124, while plate 136 can be in either an enabled state or a disabled state (with the electrostatic force being insufficient to attract the flap element 124 away from its position adjacent to plate 134 in either case). As can be seen by inspection of FIG. 3, fluid flow 140 through outlet 126 is blocked by flap element 124, instead travelling through outlet 128 as indicated by fluid flow arrows 141.

Figure 4:
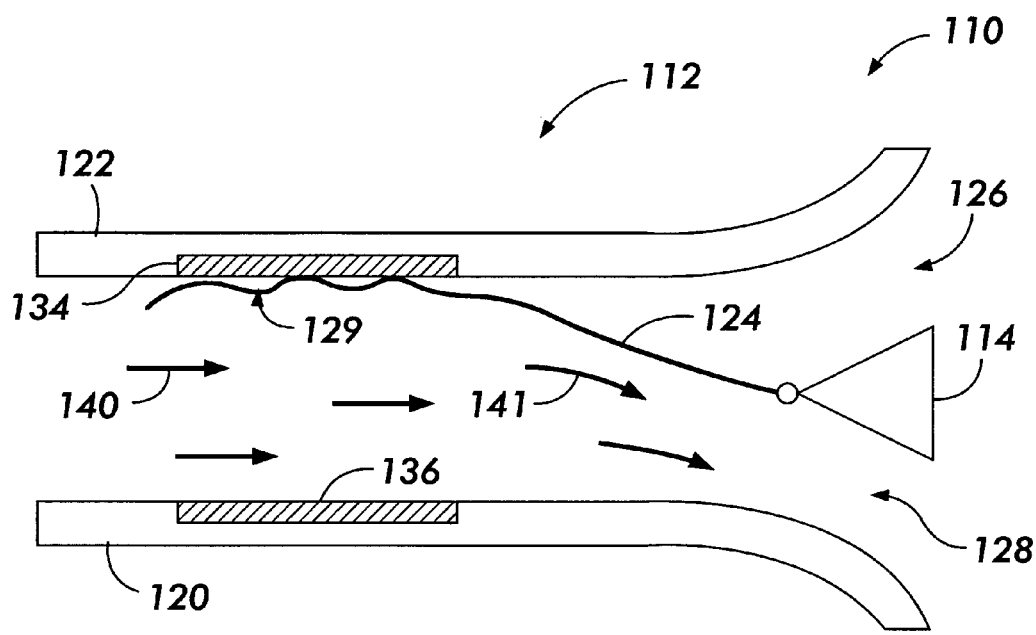
FIG. 4 is a schematic side view of the flap element of FIG. 2, with the flap element in flapping oscillation in response to fluid flow after controlled release of the first electrical first catch mechanism.
Figure 5:
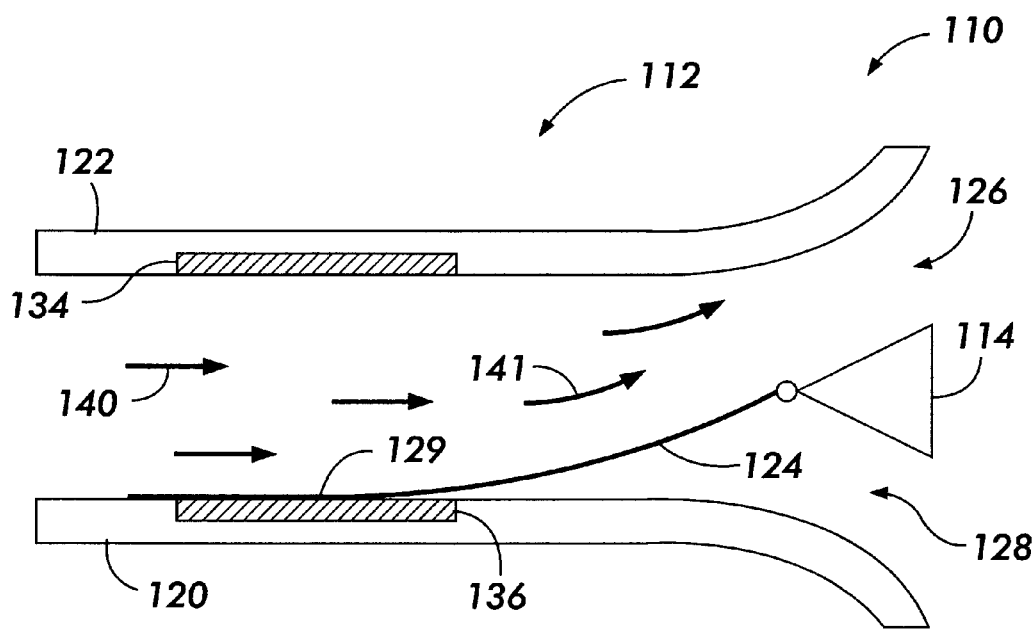
FIG. 5 is a schematic side view of the flap element of FIG. 2, with the flap element moved by fluid flow into catchment range of a second electrical catch mechanism to block the second outlet.

To switch fluid flow from outlet 128 to alternative outlet 126 simply requires reducing or eliminating electrostatic attraction between the free end 129 of the flap element 124 and the plate 134 (plate 134 is placed in a disabled state). As seen in FIG. 4, the free end 129 of flap element 124 undergoes flapping oscillation in response to Bernoulli forces induced by fluid flow 140. The flap element 124 is pulled or pushed away from its position adjacent to plate 134, and in response to flap generated tensional and compressional forces, in conjunction with fluid forces from fluid flow 140, will eventually move toward plate 136. If plate 136 is enabled to be electrostatically attractive, the flap element can be pinned adjacent to plate 136, as seen in FIG. 5. As will be appreciated, disabling plate 136 by reducing electrostatic attraction will allow the flap element 124 to move back toward plate 134.

In the foregoing example, construction of the flap element to have a flexible free end 129 provides an impulse mechanism for kicking the flap element away from one of the first and second plates 134 and 136 after one of the first and second plates 134 and 136 is controllably brought into the disabled state. Since the flap element is unstable, oscillations of the flap element in the fluid flow will eventually bring the flap element into catchment range of one of the first and second plates 134 and 136 in an activated state. As will be appreciated by those skilled in the art, the impulse mechanism can arise from Bernoulli forces exerted on a flexible flap element that induce fluttering oscillations lifting the flap (as seen in FIG. 4), or can include mechanical, electromechanical, or electromagnetic forces such as later discussed in connection with FIG. 14 that may be applied, for example, by electrically activated shape memory metals, piezoreactive ceramics, or magnetic materials.

Advantageously, valves in accordance with the present invention have high speed switching operation in a variety of flow regimes. In contrast to many conventional valve designs which are inoperative or slow in high speed fluid flow conditions, unstable valves in accordance with the present invention will generally switch faster as fluid flow velocity increases. This is due to reliance on fluid flow to move (switch) the valve, so that as fluid flow increases, the available energy to move a flap element increases.

Figure 6:
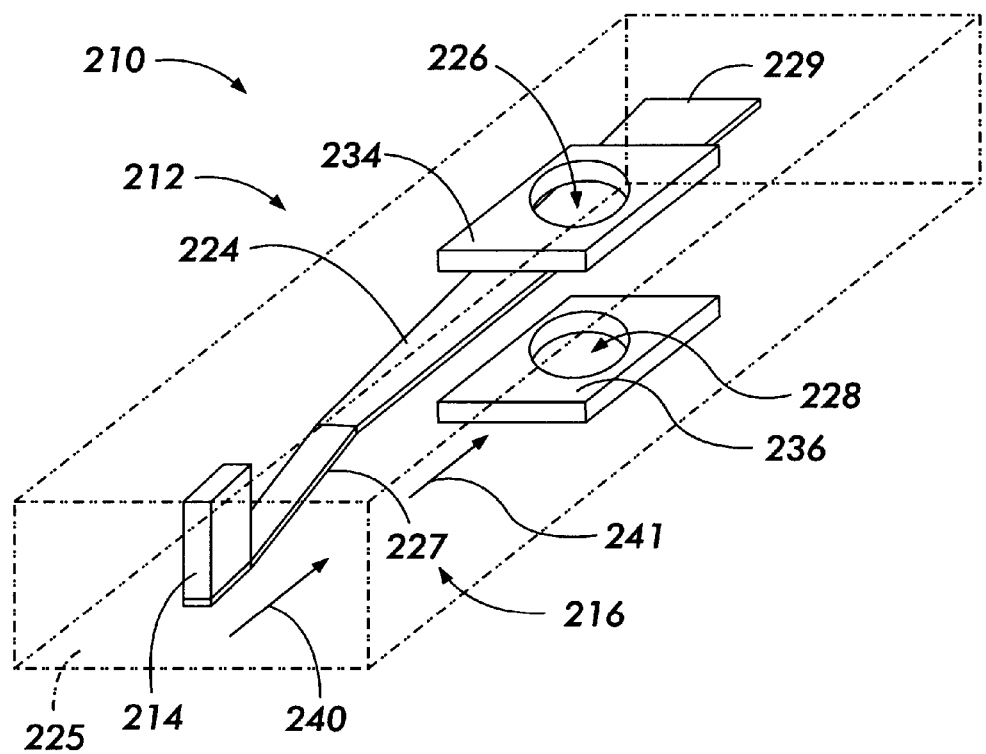
FIG. 6 is a schematic, partially broken away view of an unstable flap valve with a flap element supported by a leading edge to trail in the fluid flow.
Figure 7:
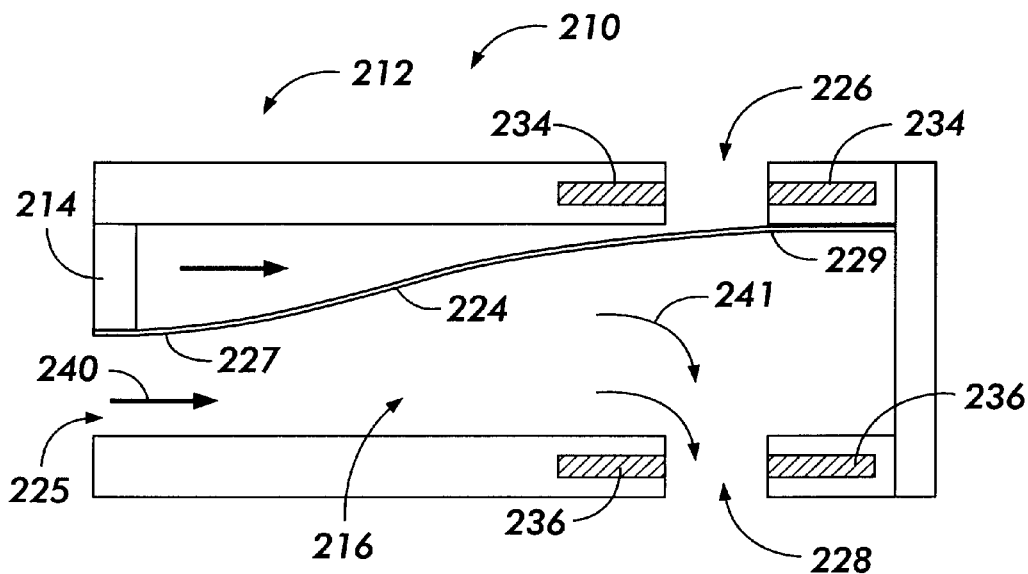
FIG. 7 is a schematic side view of the flap valve of FIG. 6.

Certain embodiments of the present invention permit other flap mounting arrangements, as illustrated with respect to FIGS. 6 and 7. For example, a flexible flap element 224 can be attached to the flap support 214 so that it trails (with respect to oncoming fluid flow 240), a free end 229 extending into the valve chamber 216. Advantageously, such a flap element 224 can be highly flexible, since buckling in response to fluid flow is much less likely to occur than in those embodiments in which a leading edge of a flap element faces into a fluid flow. As illustrated in FIGS. 6 and 7, the valve system 210 includes a valve body 212 formed to define an inlet 225 for flowing fluid (indicated by streamline arrow 240) into a valve chamber 216. The flexible flap element 224 is fixedly attached at a narrowed supporting end 227 to flap support 214, with the free end 229 of flap element 224 movable to alternatively block a first outlet 226 and a second outlet 228. Positioned immediately adjacent to the valve chamber 216 (respectively surrounding first outlet 226 and second outlet 228) are opposing first and second electrically connected plates 234 and 236. Like the embodiment of the invention described in connection with FIG. 1, the electrically connected plates 234 and 236 may generate either electrostatic or electromagnetic forces, and function as a catch mechanism for controllably latching the flap element 224 to alternatively block fluid flow through either the first outlet 226 or the second outlet 228. In operation, the flap element 224 flaps or flutters (like a flag in high winds), bouncing between a position adjacent to the first outlet 226 and second outlet 228. If either plate 234 or 236 is electrically enabled, the free end 229 is caught and electrically latched to block fluid flow therethrough, at least until the respective plate 234 or 236 is disabled and Bernoulli or other forces kick the free end 229 back into oscillatory flapping in the flow 240.

Figure 8:
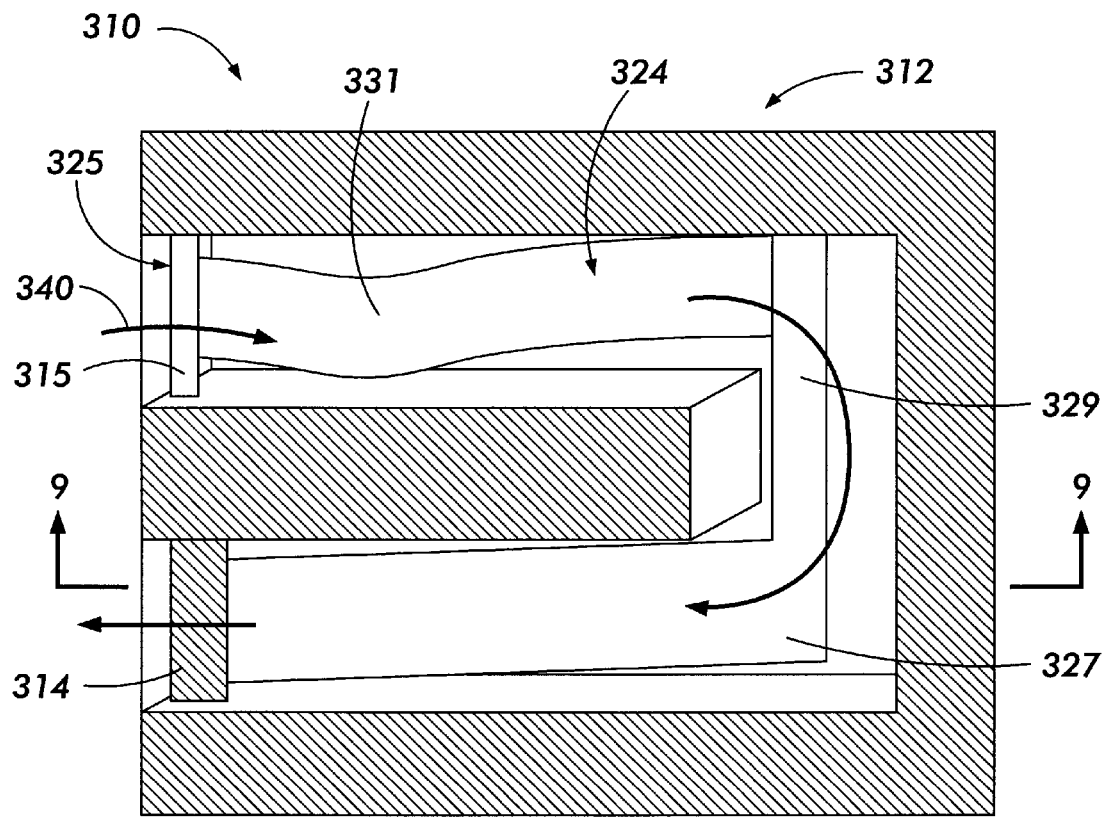
FIG. 8 is a schematic, partially broken away view of a U-shaped unstable flap valve with a flap element supported by a leading edge.
Figure 9:
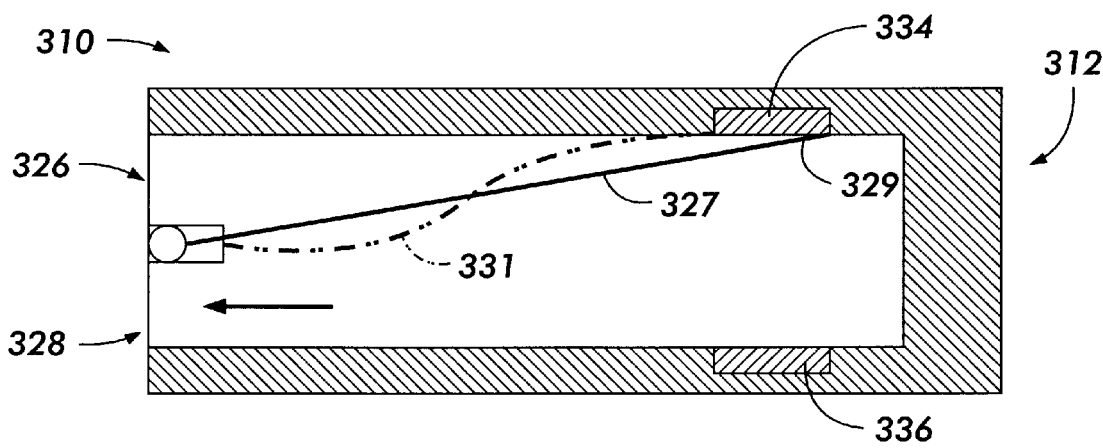
FIG. 9 is a schematic side view of the flap valve of FIG. 8.

Still another embodiment of the present invention is illustrated with respect to FIGS. 8 and 9, which respectively shows in top view and cross section (along line 9—9 in FIG. 8) a generally U-shaped valve system 310 having a U-shaped valve housing 312 with a single inlet 325, a first outlet 326, and a second outlet 328. The housing further contains a U-shaped, composite flap element 324, that includes a flexible segment 331 defining one arm of the U-shape, a rigid segment 329 defining a joining section, and a rigid segment 327 defining the other arm of the U-shape. The rigid segment 327 is dimensioned to substantially block vertical flow in the housing, only allowing horizontal fluid flow into either the outlet 326 or 328. In FIGS. 8 and 9, flow through outlet 326 is blocked by the position of rigid segment 327. To determine which outlet fluid flows out through, opposing first and second electrically connected plates 334 and 336 are positioned in the valve housing 312 to respectively attract the rigid segment 329. Like the embodiment of the invention described in connection with FIG. 1, the electrically connected plates 334 and 336 may generate either electrostatic or electromagnetic forces, and function as a catch mechanism for controllably latching the flap element 324 to alternatively block fluid flow through either the first outlet 326 or the second outlet 328. In operation, the flexible segment 331 of flap element 324 flaps or flutters, allowing rigid segment 329 to be caught by either plate 334 or 336. Flow is directed by the position of rigid segment 327 (pulled up or down by connected segments 329 and 331) into either outlet 326 or 328. When the respective plate 334 or 336 is disabled and Bernoulli or other forces kick the flexible segment 331 back into oscillatory flapping in the flow 340, allowing flow through both outlets 326 and 328, at least until one or the other latching plates 334 and 336 is enabled.

Figure 10:
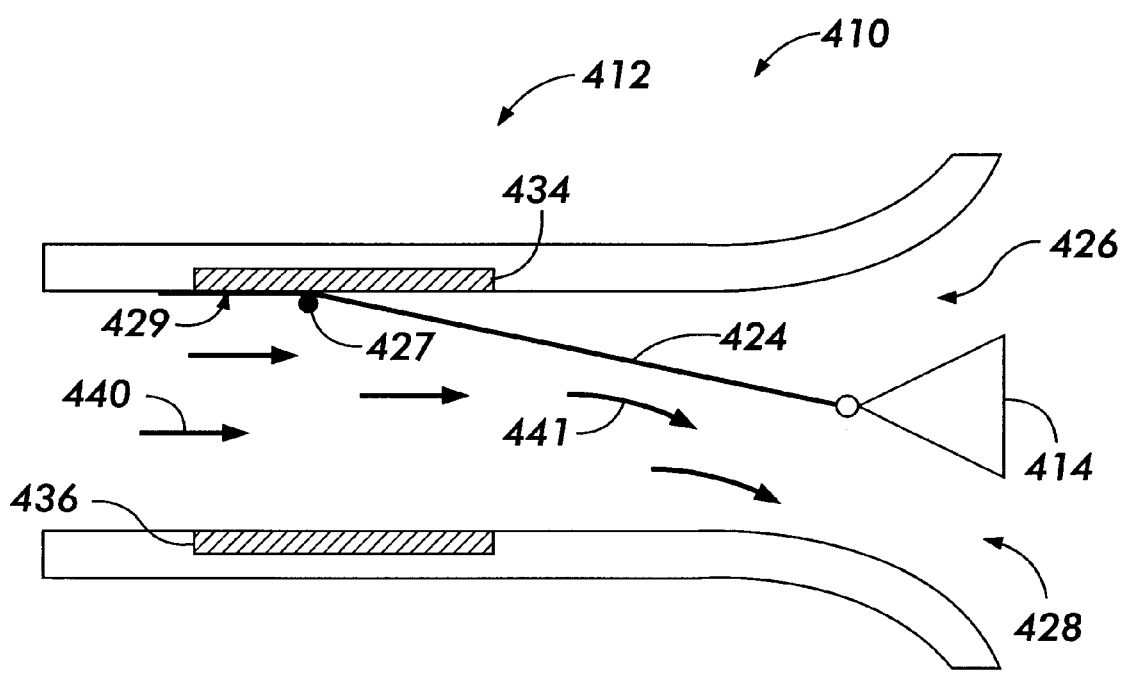
FIG. 10 is a schematic side view of an unstable flap valve having a hinged flap element.

An alternative flapping mechanism that does not necessarily require flexible flap elements for release of a flap's free end is illustrated with respect to the schematic side views of FIGS. 10, 11, and 12, which show a valve similar to that described in connection with FIG. 1, and FIGS. 2–5. As seen in FIG. 10, an unstable flap valve system 410 has a substantially rigid flap element 424 (supported by fluid diverter 414) positioned in valve body 412, with free end 129 of the flap connected by a hinge 427 to allow limited flexibility. The hinge may be integrally defined (as discussed in connection with FIG. 13), or may include pins, hooks, or other suitable connecting elements allowing rotational movement. The flap element 424 is movable to alternatively block a first outlet 426 and a second outlet 428. Opposing first and second electrically connected plates 434 and 436 are configured to controllably generate electrostatic forces in response to an applied voltage, and function as a catch mechanism for controllably latching the flap element 424 to alternatively block fluid flow through either the first outlet 426 or the second outlet 428. In FIG. 10, plate 434 is in an enabled state to provide an electrostatic force sufficient to pin the flap element 424. Fluid flow 440 through outlet 426 is blocked by flap element 424, instead travelling through outlet 428 as indicated by fluid flow arrows 441.

To switch fluid flow from outlet 428 to outlet 426 simply requires reducing or eliminating electrostatic attraction between the free end 429 of the flap element 424 and the plate 434 (plate 134 is placed in a disabled state). As seen in FIG. 11, the free end 429 of flap element 424 can rotate around hinge 427, providing a lip that fluid flow can push against to rotate the flap element 424 away from the plate 434. If plate 436 is enabled to be electrostatically attractive, the flap element can be pinned adjacent to plate 136, as seen in FIG. 12. As will be appreciated, disabling plate 436 by reducing electrostatic attraction will allow the flap element 424 to move back toward plate 434.

In the foregoing example, construction of the flap element to have a hinged free end 429 provides an impulse mechanism for kicking the flap element away from one of the first and second plates 434 and 436 after one of the first and second plates 434 and 436 is controllably brought into the disabled state. As will be appreciated by those skilled in the art, the impulse mechanism can arise from Bernoulli forces exerted on a hinged flap element, or can include mechanical, electromechanical, or electromagnetic forces such as later discussed in connection with FIG. 14 that may be applied by electrically activated shape memory metals, piezoreactive ceramics, induced pressure differentials, resistive heating of fluids, thermally active expanding materials or bimorph actuators, or magnetic materials.

Figure 11:
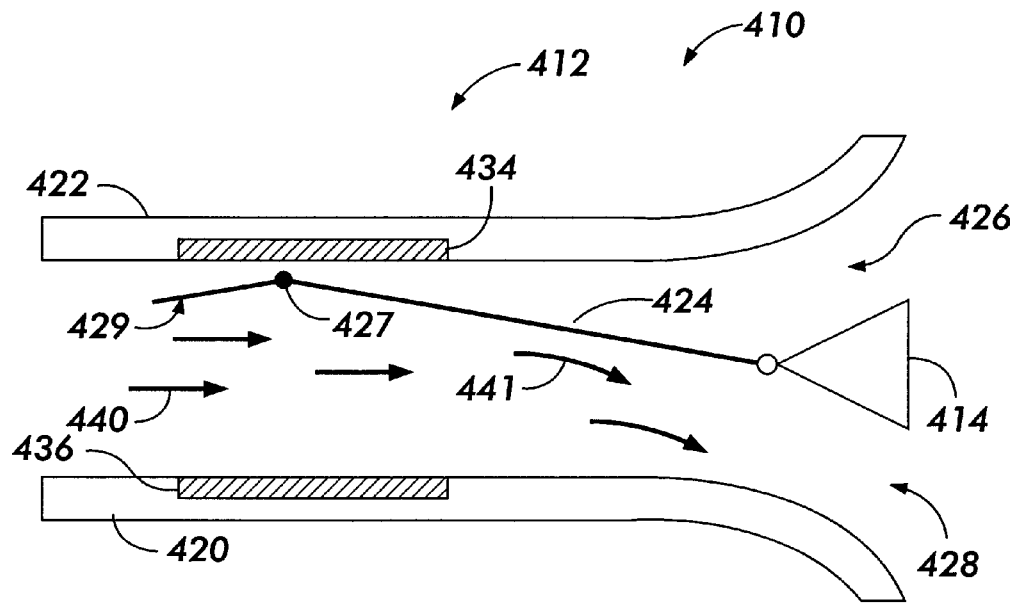
FIG. 11 is a schematic side view of the flap valve of FIG. 10 with the hinged flap element rotating about a hinge.
Figure 12:
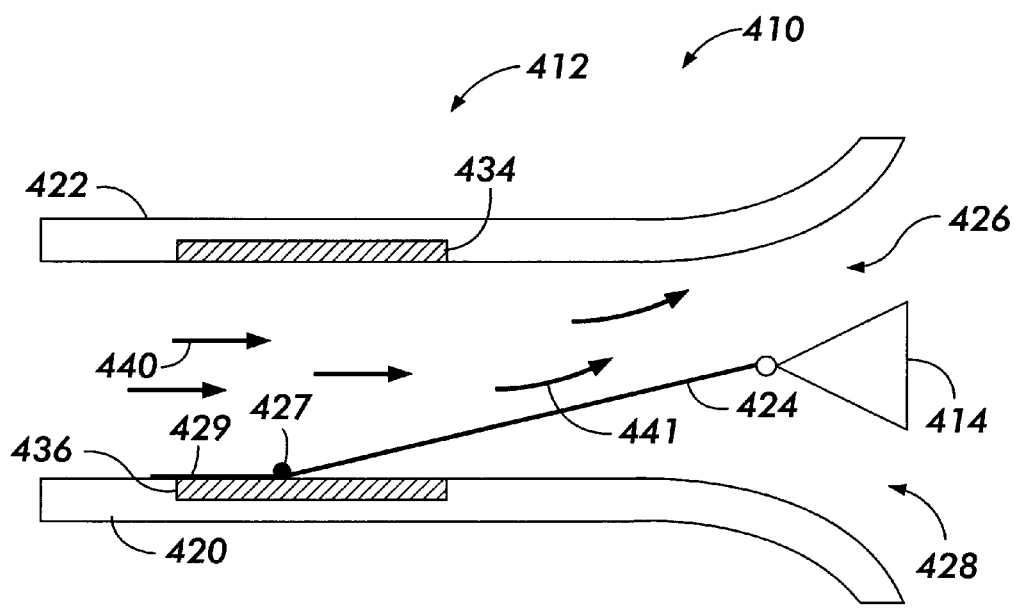
FIG. 12 is a schematic view of the hinged unstable flap valve of FIG. 10 after movement to an opposing side.
Figure 13:
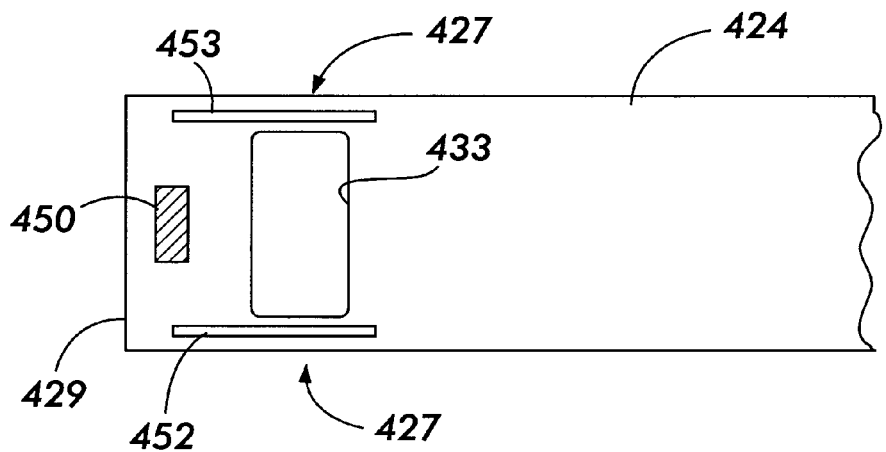
FIG. 13 is a schematic top view of a hinge.

FIG. 13 illustrates one possible hinge mechanism suitable for use in conjunction with hinged flap element 424 such as described in FIGS. 10, 11, and 12. A dual hinge is defined by removal of a central portion 433 of the flap element 424, leaving two highly flexible connecting hingepieces 427 attaching a free end 429 to the remainder of flap element 424. The flap element 424 can optionally be provided with impulse mechanisms for initiating rotation of the free end 429 relative to the rest of the flap element 424. For example, shape memory alloys 452 and 453 can be electrically induced to respond by moving from a flat to a curved shape, causing rotation of the free end 429 about hinge 427.

Alternatively, an electromagnet 450 (defined by a spiral patterned conductive coil in the flap element 424) can be constructed. Electromagnetic interaction with a permanent magnet (or another electromagnet) in a valve housing (not shown) can be used to induce rotation of the free end 429 about the hinge 427.

Figure 14:
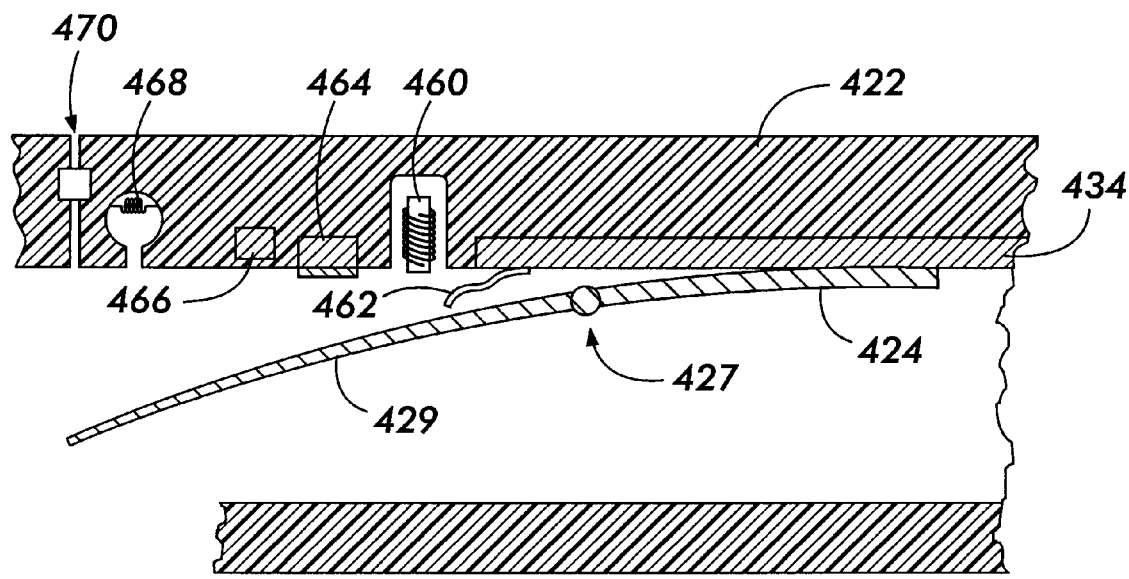
FIG. 14 is a schematic side view of various valve body mounted impulse mechanisms.

As will be appreciated, impulse mechanisms for initially kicking a flap element away from an attractive plate into a fluid stream are not required to be situated solely in the flap. As illustrated in FIG. 14, various optional impulse mechanisms can be wholly or partially located in the valve housing 422 adjacent to the flap element 424. For example, inductively movable pins 460, electrically activated shape memory metals 462, piezoreactive ceramics 464 that expand and contract, or magnetic materials 466 (electromagnetically reactive against similarly poled elements flap 424), induced pressure differentials (e.g. by a valved fluid conduit 470), resistive heating of fluids (e.g. thermal heating of liquid in a pocket 468 to generate expansive gaseous pressure), or any other conventional impulse mechanism can be used alone or in conjunction with other impulse mechanisms to move flap element 424. Typically, one or more of these impulse mechanisms are controlled by a control unit 32 (not shown) such as discussed in conjunction with FIG. 1 to act in conjunction with deactivation of plates or other flap element latching mechanisms.

Figure 15:
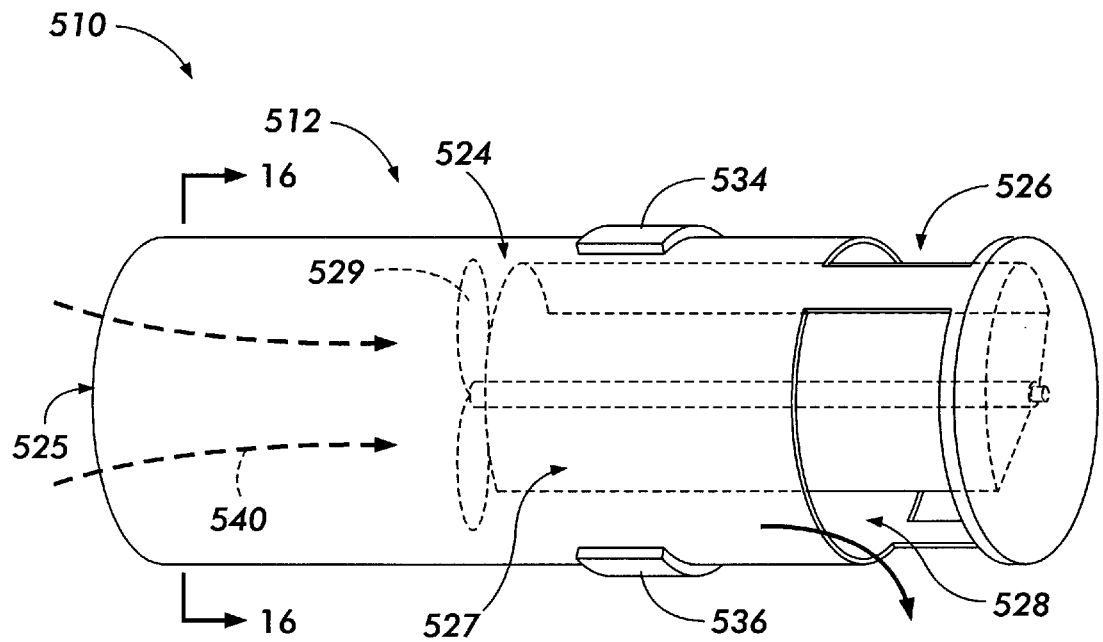
FIG. 15 is a schematic side view of rotating valve.
Figure 16:
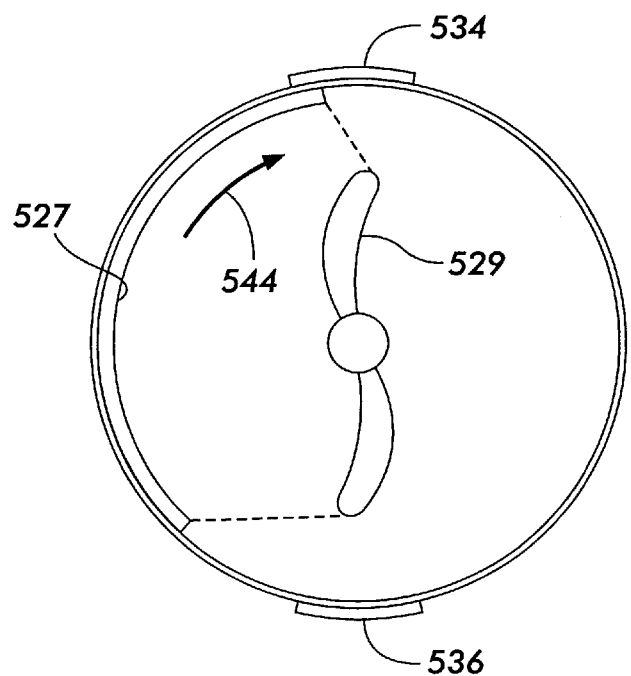
FIG. 16 is a cross sectional view along line 16—16 of the rotating valve of FIG. 15.

Still another embodiment is illustrated in side view in FIG. 15 and cross sectional view in FIG. 16 (along line 16—16 of FIG. 15), a valve system 510 includes a cylindrical valve body 512 having an inlet 525, a first outlet 526, and a second outlet 528. The cylindrical valve body 512 rotatably supports a rigid inner shell 527 capable of rotating in a preferred direction (determined by the curvature and orientation of the vane or propeller, which orientation may itself be modifiable through suitable vane movement mechanisms) to alternatively block either first outlet 526 or second outlet 528. The inner shell 527 is rotated by action of a connected vane or propeller 529, that itself rotates in response to fluid flow 540. This rotation can be enabled by centrally positioned propellers as shown in the Figures, or alternatively, shell mounted vanes, reverse Archimedean screws, or other mechanisms for imparting rotation to the inner shell can be employed. The rotation of the inner shell 527 can be stopped by enabling electrically controlled plates 534 or 536 to interact and catch the inner shell 527, allowing complete or partial blocking of flow through a defined outlet. Because the flow 540 continually exerts substantial forces against propeller 529, it is generally advantageous in this embodiment of the invention to use strong electromagnetic latching with plates 534 or 536, or use of optional mechanical catches, such as the shape memory alloys or pins described in conjunction with FIG. 14.

As will be appreciated, the foregoing cylindrical shell can be modified to rotate about the valve chamber (as an outer shell) to block the outlets. A single outlet can be used (if a suitable impulse mechanism is provided to move the shell and initiate fluid flow, or if blocking of fluid flow is only partial), as well as multiple outlets. In addition, by adjusting the area of outlet covered, the fluid flow volume through outlets can be controlled. Alternatively, by the use of large numbers of outlets (not shown), controlling fluid flow volume (in discrete volumetric steps) based on the number of outlets covered by inner shell 527 is possible. As those skilled in the art will appreciate, the inner shell 527 is not required to be cylindrical, but may be configured as a disk or semicircle fitted with apertures, the apertures being movable over the valve defined outlets. When such disks are attached to a propeller or fitted with projecting vanes to promote rotational movement, fluid flow volume through the combination of the apertures and the outlets can be precisely controlled. In certain embodiments, even a flat plate constrained to move adjacent to an outlet is laterally movable in a valve chamber, if the flat plate is fitted with an attached vane. By controlling orientation or amount of projection of the vane into fluid flow, the vane can be used as a rudderlike steering mechanism to alternately move the flat plate to In block or unblock fluid outlets. As those skilled in the art will note, such vane steering mechanisms can be employed in conjunction with other valve embodiments in accordance with the present invention.

Figure 17:
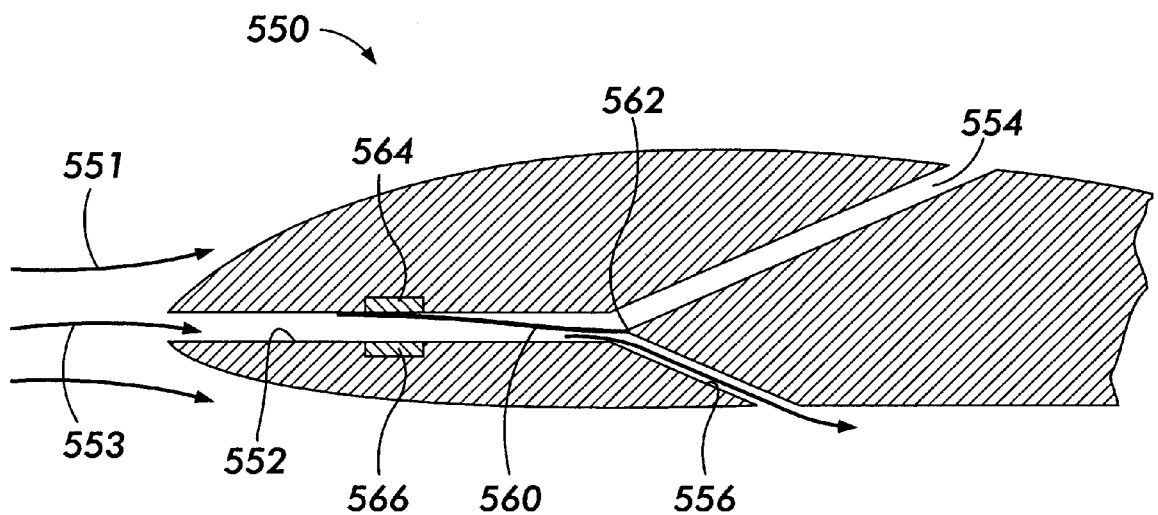
FIG. 17 is a perspective view of a flow redirection flap element for use in conjunction with an airfoil.
Figure 18:
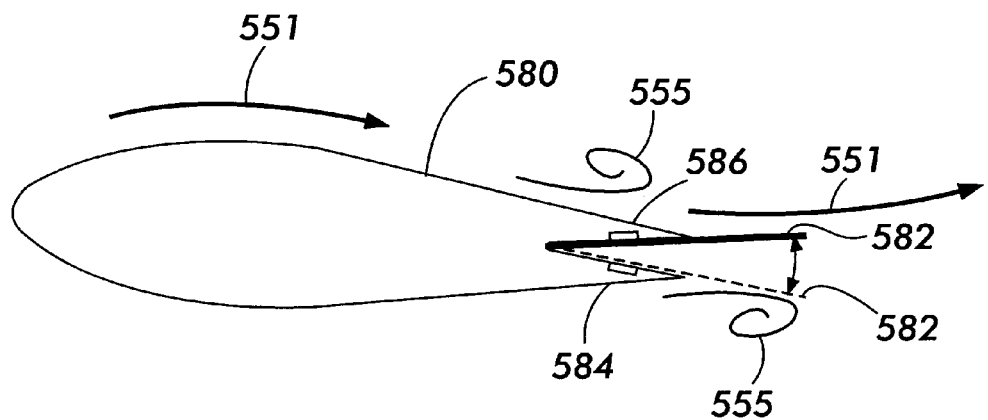
FIG. 18 is another external flow redirection flap for an airfoil.

Various embodiments of the invention suitable for controlling or redirecting at least some part of external air flow 551 are illustrated with respect to FIGS. 17 and 18. As illustrated in FIG. 17, an airfoil 550 has an inlet 552, a first outlet 554, and a second outlet 556. A flap element 560 attached at support 562 extends toward the inlet 552. Operation of the flap element 560 is similar to that discussed in connection with FIG. 1 and FIGS. 2–5, with the unstable flap element capable of moving to alternately block fluid flow 553 through outlet 554 or 556. Like those flap elements previously discussed, flap element 560 is held in place by electrical latch mechanisms 564 and 566.

FIG. 18 illustrates a flap element 582 trailing outside an airfoil 580 to redirect external air flow 551. The flap element 582 is held in place by electrical latch mechanisms 584 and 586, and is moved between alternate positions (as indicated by solid line and dotted line 582 in FIG. 18) with the aid of external air flow 551 and vortices 555 that cause oscillation of the unlatched flap element. This particular application is of particular use for aerospace or marine applications, but other objects positioned in high speed fluid flows could utilize similar fluid redirection systems.

Figure 19:
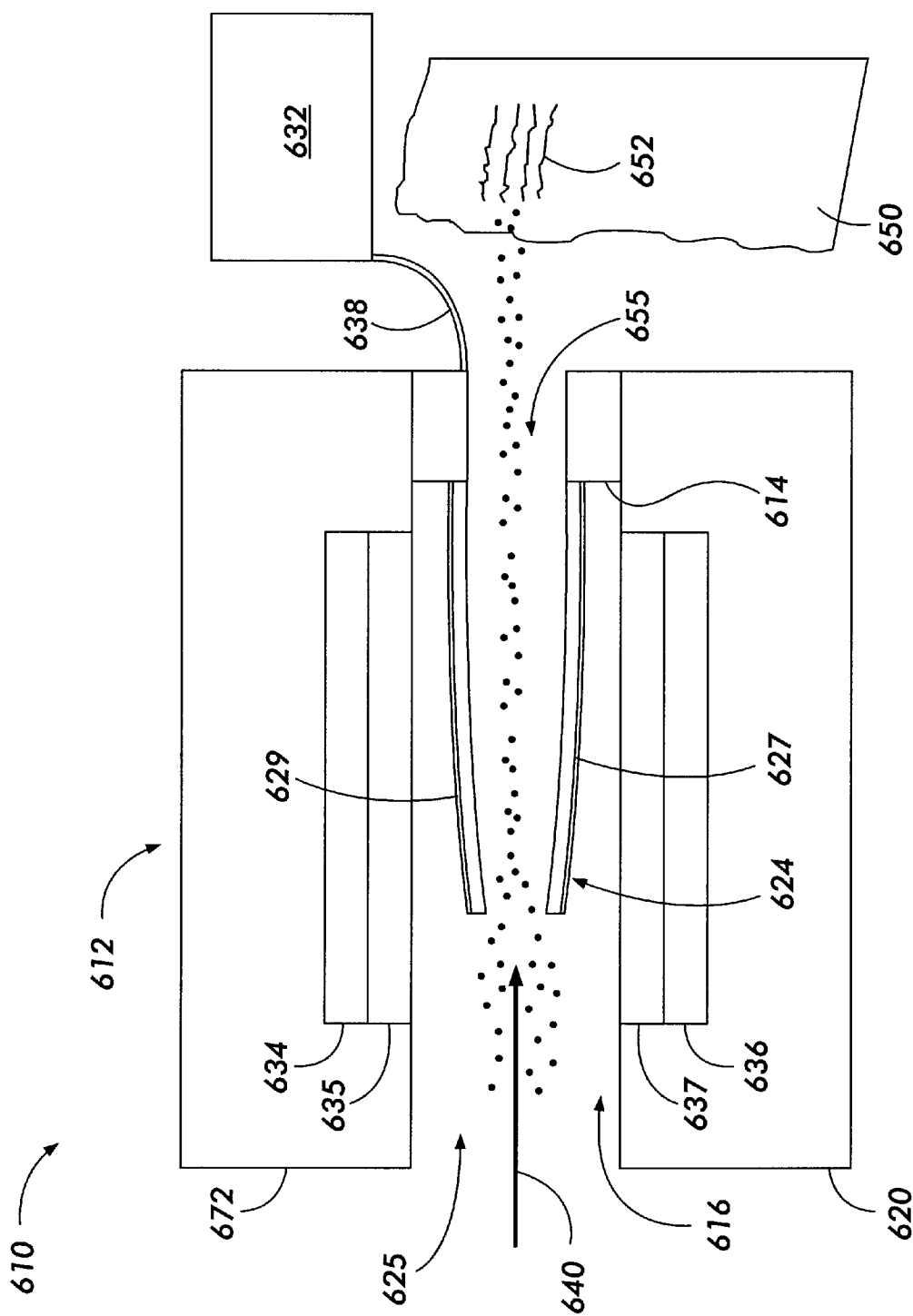
FIG. 19 is a schematic side view of a dual flap system in a open position.
Figure 20:
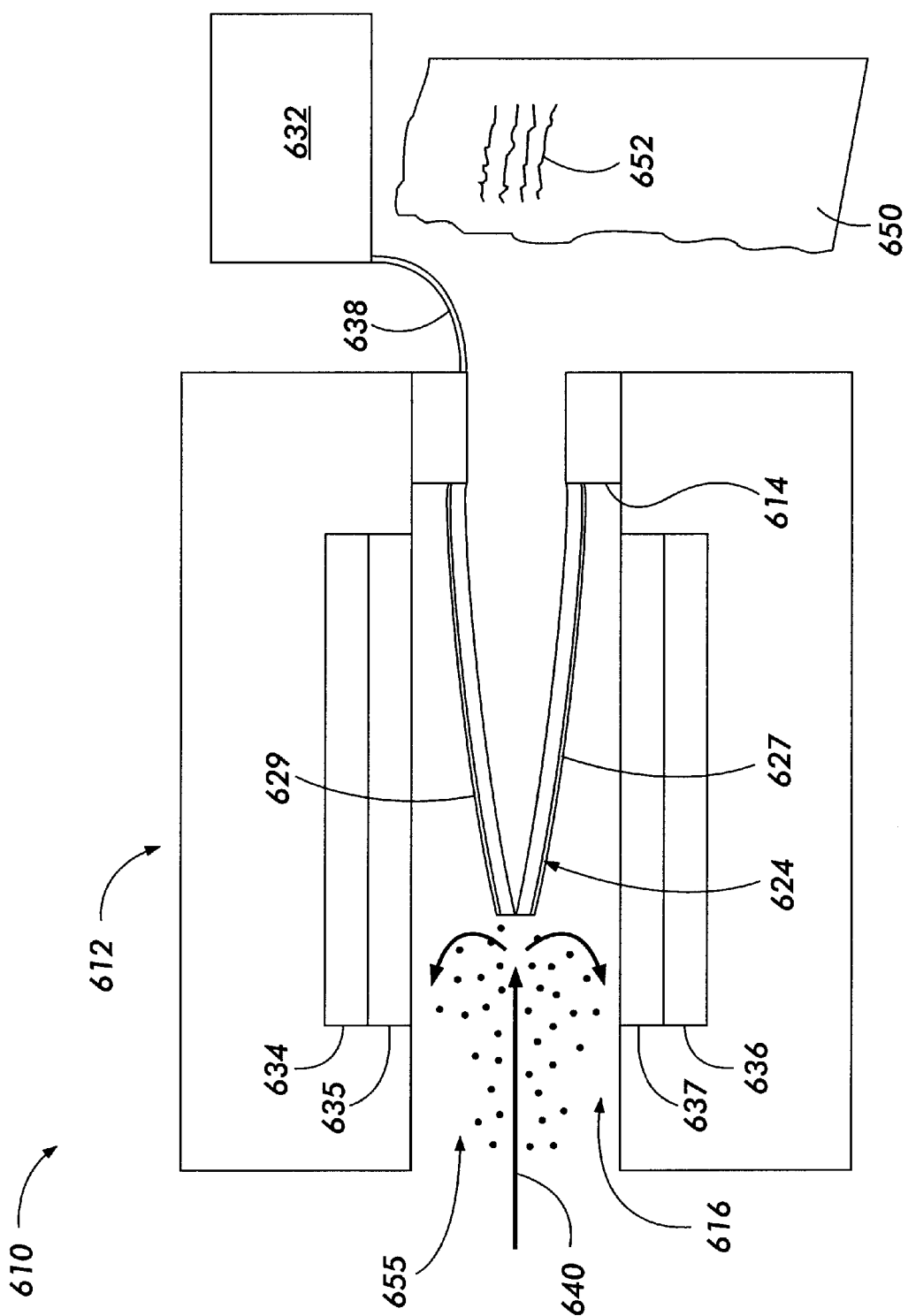
FIG. 20 is a schematic side view of a dual flap system of FIG. 19 in a closed position.

In addition to single flap (or rotating inner shell) systems having a single movable fluid flow blocking element, the present invention contemplates the use of multiflap or multi moving element systems having two or more cooperatively movable flow control elements. For example, FIGS. 18 and 19 illustrate a dual flap system 610 that enables continuous or pulsatile control of fluid flow 640 having entrained liquid or solid particles 655. The particles 655 may be liquid ink or solid toner provided from a marking agent reservoir (such as the valve chamber or any externally connected chamber) and used to coat, print or mark a substrate such as markable media 650 (e.g. paper) located near the valve outlet. The valve system 610 includes a valve body 612 formed to define an inlet 625 for flowing fluid (indicated by streamline arrow 640) into a valve chamber 616 situated between valve walls 620 and 622. The dual flap element 624 includes a first flap element 627 and a matching second flap element 629. Positioned immediately adjacent to the dual flap elements in valve chamber 616 are opposing first and second electrically connected plates 634 and 636. The electrically connected plates 634 and 636 may generate either electrostatic or electromagnetic forces, and function as a catch mechanism for controllably latching each flap 627 and 629 of the flap element 624 in an open position as seen in FIG. 19, or a closed position as seen in FIG. 20. Electrical control is maintained through control lead 638 electrically connected between the plates 634 and 636 and a control unit 632. In FIGS. 19 and 20, plate 634 is a charged electrostatic plate separated by insulative dielectric plates 635 and 637. As will be appreciated, alternative catch mechanisms such as discussed in connection with foregoing Figures may alternatively be employed, with electromagnetic catches using electromagnets circuits spirally inlaid or patterned on the flaps, and permanent magnets inset in the valve body 612 being preferred. Alternatively, the valve body 612 may not have any catch mechanisms, with each flap 627 and 629 electrostatically or electromagnetically attracting each other to remain closed when enabled. Each flap may optionally have various piezoelectric segments, ribs or segments of shape memory alloys, or electromagnetic or electrostatic active area to allow for stiffening, loosening, or otherwise controllably modifying the flexibility of the flaps. Advantageously, this allows for fine tuning operating oscillation parameters of the flaps.

In one preferred operating mode, a dual valve system 610 can be operated in a pulsatile mode that relies on a complex interaction between pressure in chamber 616 and the flaps 627 and 629. If the flaps 627 and 629 are attached to each other so as to leave only a small gap as shown in FIG. 19, fluid flowing through the gap will reduce pressure between the flaps, inducing closure of the flaps as seen in FIG. 20. This in turn eliminates flow of fluid flow 640, and allows the inherent elasticity of the flaps to spring open the flaps, is leaving a small gap, and initiating a repeat of the open/close cycle. As will be appreciated, the pulsatile cycle can be intermittently stopped by catching the flaps in an open position (with a catch mechanism between each flap and the sidewalls 620 and 622 of valve body 612), or in a closed position (with a catch mechanism between the flaps). Advantageously, the cyclic nature of the oscillations allow discrete times for open or closure, even in the absence of an accurate control scheme, since the flaps can generally only be caught in a closed position when the flaps have oscillated to their normal closed position ( or moved apart adjacent to sidewalls 620 and 622 for the open condition). As will be appreciated, the foregoing cyclic operation is only possible at certain flow pressures, with lower pressures being inadequate to sustain pulsatile flow and higher pressures causing the flaps to remain closed in the absence of an external restoring force (such as may be provided, for example, by electromagnetic actuation)

Figure 21:
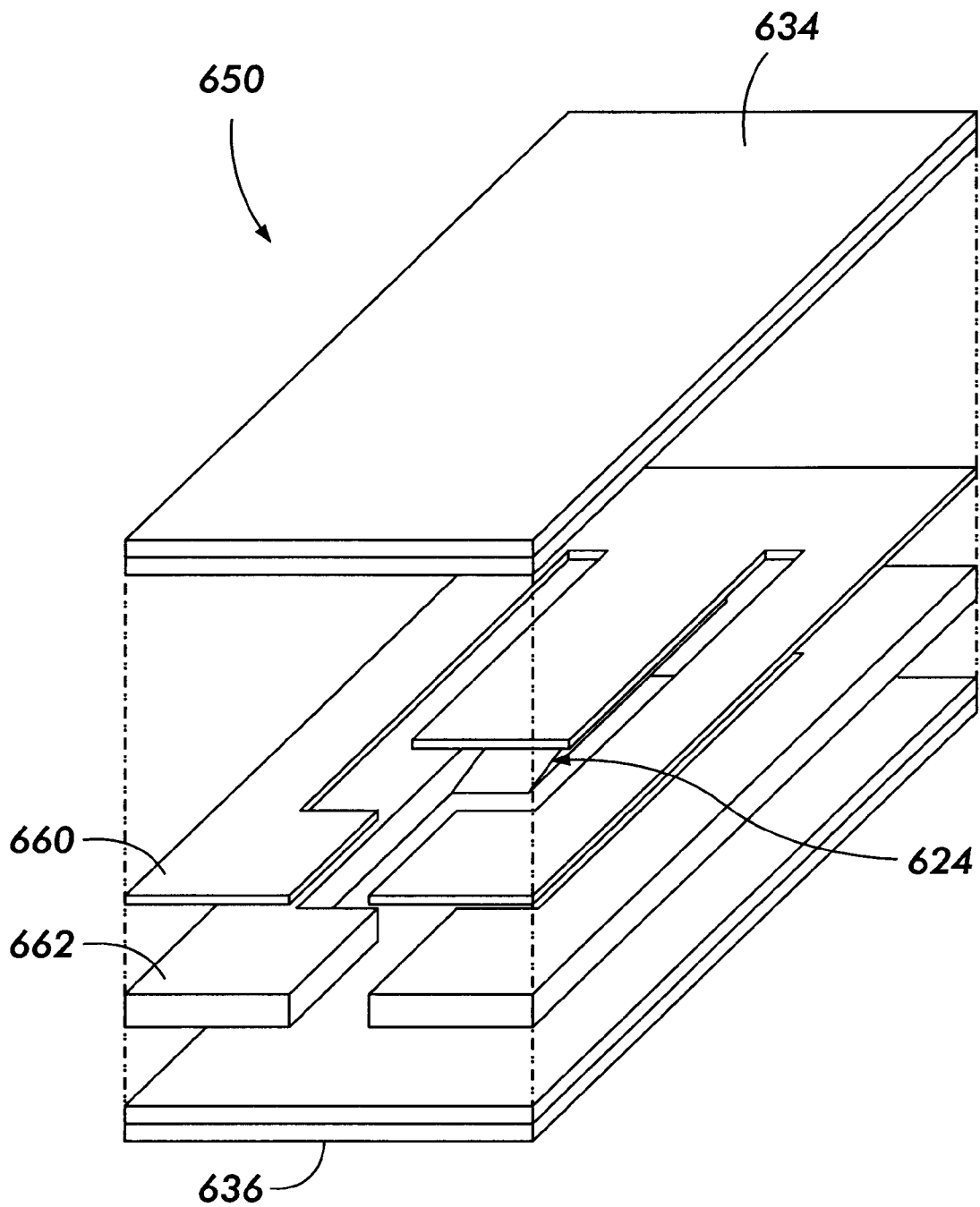
FIG. 21 is an exploded perspective view of a flap valve similar to that shown in FIGS. 19 and 20 constructed using dielectric laminates.

Construction of an oscillatory valve does not always require a dual flap system. For example, as seen in FIG. 21, a single oscillating flap system can be constructed using a metal flap 624 attached to support 660 and sandwiched in a laminate between a chamber spacer 662, and a top and bottom electrostatic plate 634 and 636. In such a system, the bottom electrostatic plate 636 effectively acts as stiff matching flap operating in conjunction with a flexible flap 624. Advantageously, this method of construction allows for batch fabrication of large numbers of pulsatile flap valves using die cut, etch, or other patterning techniques also suitable for modifying printed circuit boards. Various control and construction techniques suitable for the present invention are discussed in U.S. patent application Ser. No. 08/756,153 titled "Paper Handling System Having Embedded Control Structures", with inventors Berlin et al., the disclosure of which is herein specifically incorporated by reference.

Figure 22:
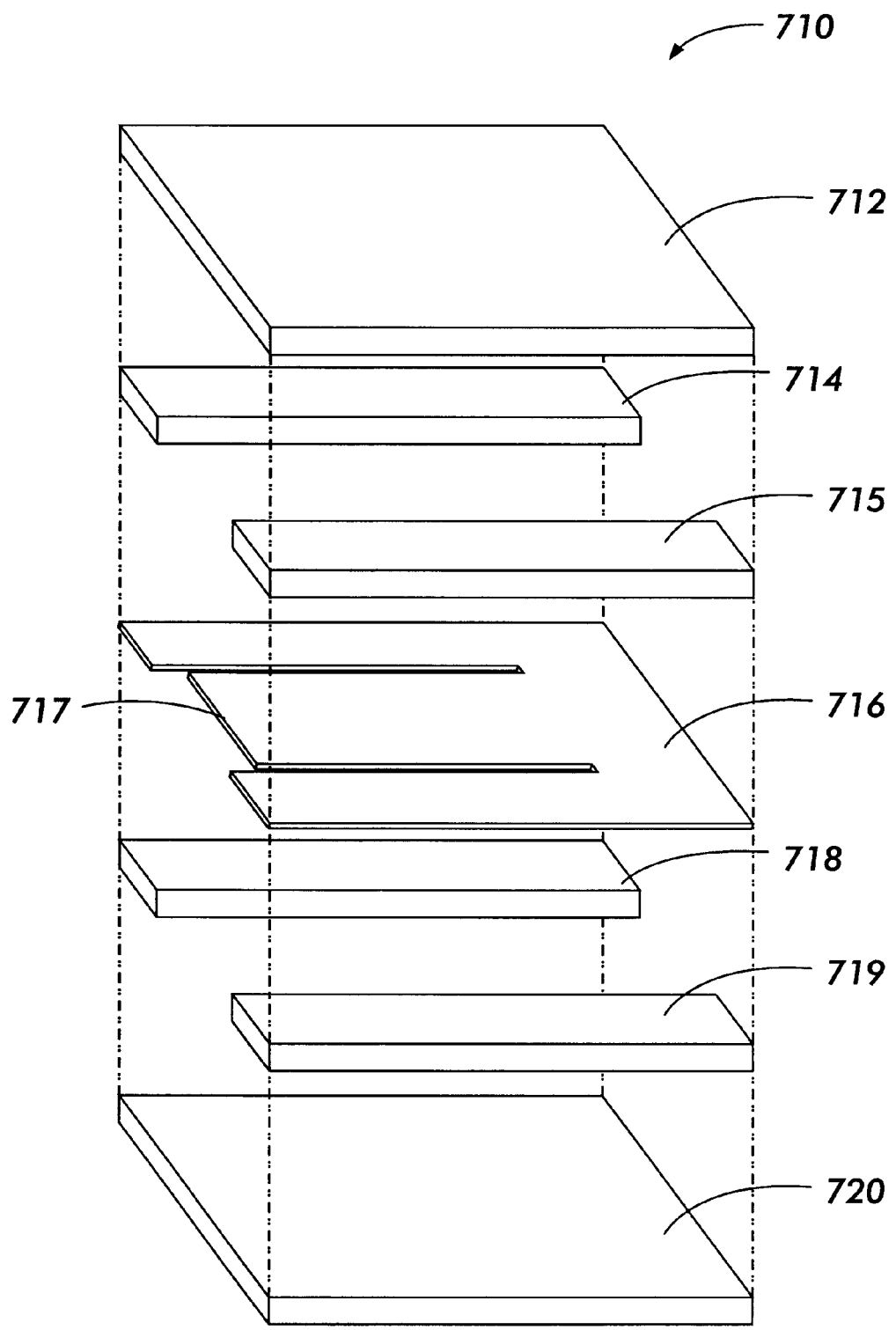
FIG. 22 is an exploded perspective view of a flap valve constructed using dielectric laminates.

Batch processing laminate construction techniques suitable for creating elements of the foregoing valve systems are also illustrated in conjunction with FIG. 22. As seen in FIG. 22, a valve 710 can be constructed by laminating together a conductive top layer 712, spacers 714 and 715 to help define a valve chamber, a dielectric coated flap support 716 with dielectric metal coated flap 717, more spacers 718 and 719, and a conductive bottom layer 720. When assembled, a single inlet and two alternately blockable outlets are defined, with electrostatic attraction between the flap 717 and either the top layer 712 or the bottom layer 720 operating as a catch mechanism to control the valve 710.

Figure 23:
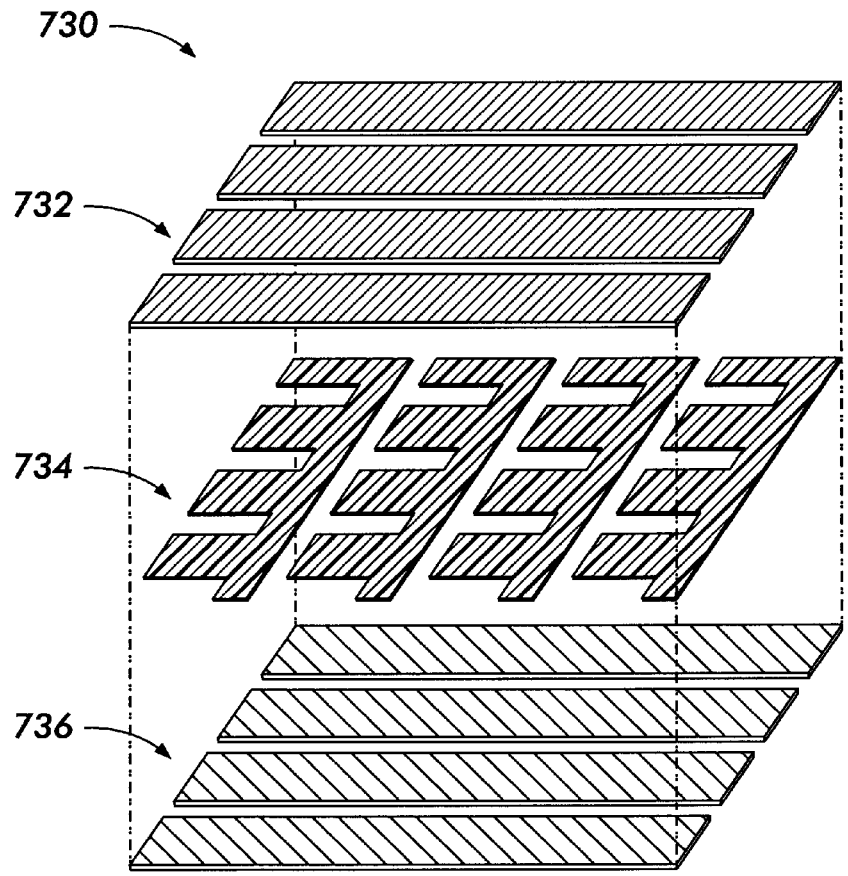
FIG. 23. is an exploded perspective view of a flap valve array constructed using dielectric laminates.
Figure 24:
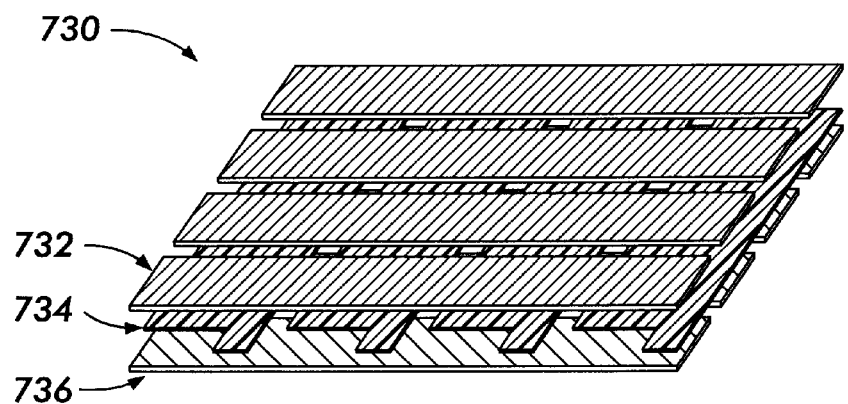
FIG. 24 is an assembled view of the flap valve array of FIG. 23.

As will be appreciated, batch construction techniques can easily be extended to allow creation of large valve arrays 730, as seen in FIGS. 23 and 24. As seen in those Figures, a conductive top layer 732 with integral spacer elements, a dielectric coated flap support 734 with multiple dielectric metal coated flaps, and a conductive bottom layer 720 with integral spacers can be combined to form a large array of unstable flap valves in accordance with the present invention.

In certain embodiments of the present invention, valves in accordance with the present invention can be constructed at least in part from a dielectric material forming a laminate. The valve is typically embedded within multiple laminate layers, with electrical connections, electrostatic or electromagnetic control structures being incorporated within or between laminate layers. The dielectric can be a fibrous, woven, extruded, or deposited polymer; a ceramic, or other dielectric material. In a preferred embodiment, the laminate layer includes a dielectric base material and an impregnated bonding resin such as is commonly employed in conventional printed circuit board construction. The unstable valve can be embedded in the laminate, and connected to at least one electrical connection to allow the valve to be electrically powered and controlled (using, for example, electrostatic plates or electromagnetic coils). When dimensional stability or accurate spacing of large arrays of valves is important, the laminate can be rigidly constructed from woven glass and high bonding strength resins such as epoxies or polyimides. Conversely, if flexibility or smooth curves are needed in a particular application (e.g. an array of microvalved air jets for supporting objects moved in a tightly curved pathway), a flexible laminate constructed in part from polyimide, polyethylene terephthalate, aramid, or polyester dielectric films, and flexible polyester resins may be suitable.

The foregoing laminate embedded valve can be grouped into large numbers of one, two, or three dimensional arrays of actively or passively addressable arrays. Since such arrays can require positioning, mounting, and supplying power and control address lines to tens of thousands of valves, low cost and reliable control systems are needed. In one preferred embodiment, valves can be interconnected (passive addressing), or individually connected (active addressing) to power and control lines by photolithographically defined and etched leads. Conventional printed circuit board construction techniques can be used, with electrodeposited metals (e.g. copper, lead, gold, or various standard alloys), adhesively attached and patterned as part of a photochemical etch process, providing electrical connections for powering, controlling, or receiving sensed information from the valves. As will be appreciated, when extensive electrical connections are required, multilayer photolithographically etched boards can beneficially be used. In addition to die cutting, drilling, or punching techniques, movable or partially unsupported components (such as a flap) can be defined by sacrificial etching techniques or other suitable batch processing techniques for undercutting or three dimensional shaping of components. Use of such sacrificial etching techniques in conjunction with printed circuit board laminates advantageously allows low cost construction of large numbers valves, sensors, and conduit systems. Alternatively, small scale valves can be created by various conventional microelectromechanical techniques, including but not limited to surface or bulk etching, micromachining, techniques based on LIGA, or any other known techniques for small scale fabrication.

A particularly preferred embodiment of the present invention provides for valves embedded or attached immediately adjacent to conduits, passageways, or apertures defined in or supported by the laminate. Large scale arrays of valves for controlling fluid flow can be easily connected to centralized or distributed controllers by the photolithographically formed metallic electrical connections. In conjunction with appropriate sensors and fluid pressure sources, these arrays can be used to precisely control fluid flow, for dynamic control of fluid instabilities, for supporting movable objects such as paper, or for injecting electrical charge, dyes, inks, or chemicals into chambers or conduit systems.

As those skilled in the art will appreciate, various valve systems can be combined for a desired application. For example, FIG. 25 discloses a printer system 810 for marking paper 815. The paper 815 can be supported and moved by numerous air jets emitted by a plurality of actively or passively addressed valves 820 in accordance with the present invention that together define an air jet conveyor 812. Paper movement and valve operation on conveyor 812 can be tracked by an embedded sensor array 816 (which can include various optical, mechanical or thermal sensors distributed within or in the vicinity of the air jet conveyor 812), and valve operation controlled by sensor/control unit 832 to (connected by sensor/control leads 838 to the sensor array 816 and valves in air jet conveyor 812). As will be appreciated by those skilled in the art, large arrays of valves in accordance with the present invention have particular utility in conjunction with an object transport device or other material processing system that must precisely control position and velocity of paper or other objects moving is through the system. Such a system is disclosed, for example, in U.S. Pat. No. 5,634,636, assigned to Xerox Corp., the disclosure of which is hereby expressly incorporated by reference.

The present invention of a sensor enabled air jet conveyor 812 is capable accurately supporting flexible objects such as continuous rolls of paper, sheets of paper, extruded plastics, metallic foils, wires, or optical fibers. In such systems, the flexure modes can result in complex object behavior that may require constant high speed switching of numerous valved high velocity air jets in accordance with the present invention. Unlike rigid objects, flexible objects are dynamically unstable when supported by air jets, with edge curl, flutter, or other undesirable dynamic movements continuously occurring during support and transport. In operation, the sensing array continuously (or intermittently) determines paper position, and sensor/control unit 832 connected to the sensing array 816 is configured to modify paper trajectory (i.e. the three dimensional travel path of the paper as a whole, including the various subregions of the paper such as an upcurled edge or downturned corner) in response to information received from the sensing array 816. In response to the calculated paper trajectory, the air jet sensor/control unit 832 modifies paper movement or orientation (for example, by selectively increasing or decreasing air flow from air jets that impart momentum to defined subregions of the paper) to nearly instantaneously correct for discrepancies in the motion state of the paper, including its position, orientation, trajectory, velocity, flexure, or curvature. In preferred embodiments, the plurality of valved air jets can be used to apply tensile or compressive forces to flatten (e.g. decurl) paper, and the air jet sensor/control unit 832 can be used to maintain paper in this flattened position during transport. Of course, other paper positions (in addition to flat) can also be maintained, with, for example, the plurality of opposed air jets being used to generate sufficient force to curve selected subregions of the paper. Further details related to air valve control and operation in an air based paper conveyor system are disclosed in U.S. Pat. No. 5,634,636.

Figure 25:
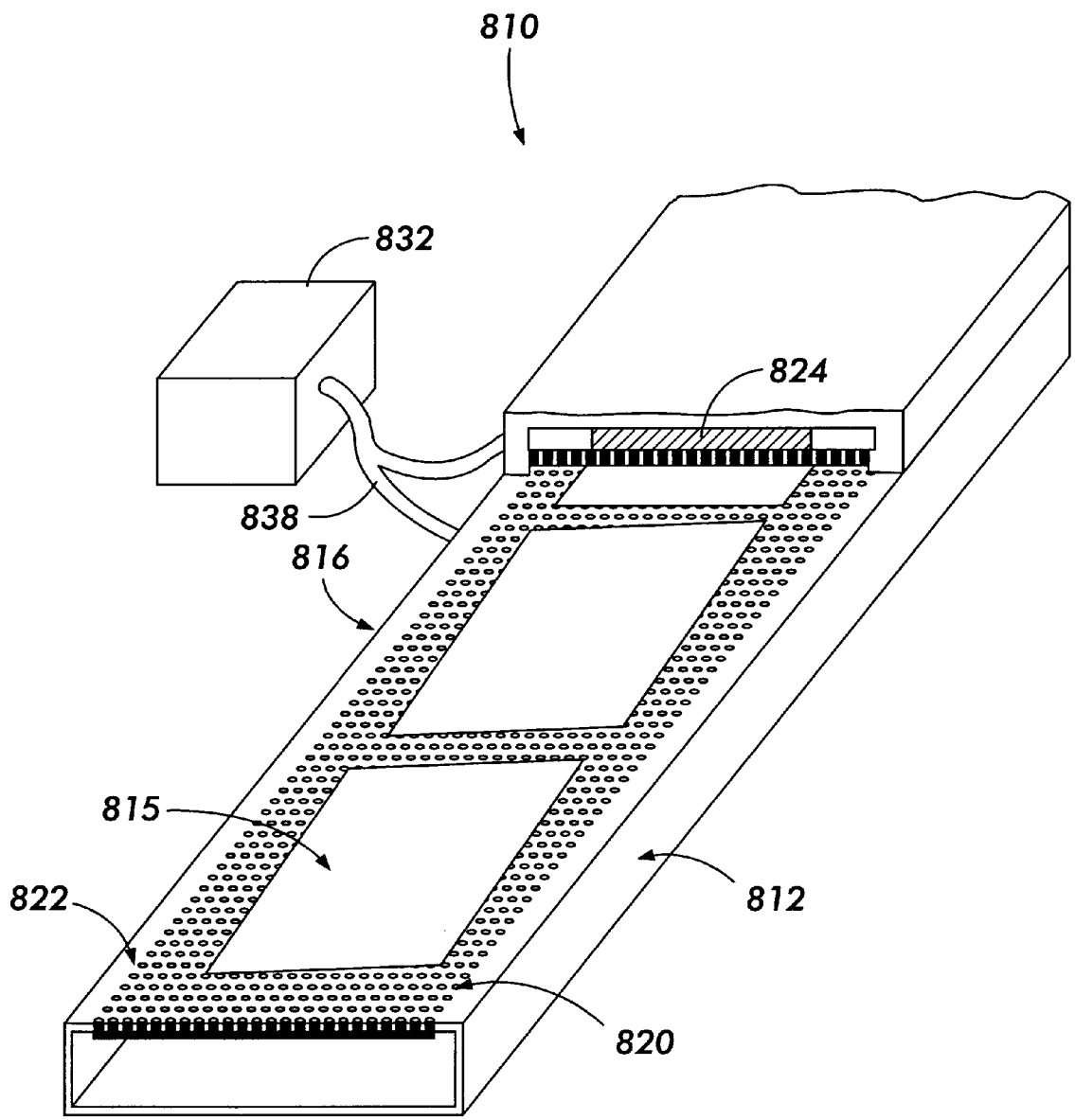
FIG. 25 is a view of an airjet paper conveyor system with ejecting valves for marking paper.

In addition, pulsatile valves such as disclosed in connection with FIGS. 19 through 21, or other valve designs in accordance with the present invention can be used in conjunction with marking agents to mark paper, as indicated by ejecting valves 824 in FIG. 25. Marks can be formed by ejection of discrete droplets of airborne ink through ejecting valves 824 in accordance with present invention, or by ejection of solid toner particles capable of later fusing to paper. Although various ejecting valve designs are suitable, in one preferred embodiment ejecting valves 824 include oscillatory dual (or single) flap valves configured to eject ink or toner particles such as earlier described in connection with FIGS. 19, 20, and 21.

As those skilled in the art will appreciate, other various modifications, extensions, and changes to the foregoing disclosed embodiments of the present invention are contemplated to be within the scope and spirit of the invention as defined in the following claims.

What is claimed is:

1. A fluid valve comprising
   a valve chamber supporting fluid flow, the valve chamber having an inlet and an outlet,
   a flap element positionable in the valve chamber to periodically block the outlet in response to periodic induced pressure differentials exerted against the flap in response to fluid flow, and
   a catch mechanism for controllably latching the flap element in one of an open position allowing fluid flow and a blocked position stopping fluid flow.

2. The fluid valve claim 1, wherein the catch mechanism further comprises a first electrostatic plate separated from the flap element by a first dielectric, and an electric charging unit connected to at least one of the flap element and the first electrostatic plate to apply a voltage differential for electrostatically attracting and holding the flap element in one of an open position and a blocked position.

3. The fluid valve of claim 2, wherein the electrostatic flap is positioned in the valve chamber to attract the flap element.

4. The fluid valve of claim 1, wherein the catch mechanism further comprises an electromagnet attached to one of the valve chamber and the flap element to electromagnetically hold the flap element in one of an open position and a blocked position.

5. The fluid valve of claim 4, wherein the electromagnet is defined in the valve chamber.

6. The fluid valve of claim 1, further comprising a matching flap positioned to periodically contact the flap element.

7. The fluid valve of claim 6, wherein the flap element and the matching flap are positioned to oscillate within the valve chamber, with the outlet defined between the flap outlet and the matching flap.

8. The fluid valve of claim 6, wherein the catch mechanism further comprises first and a second catch mechanisms for controllably latching the flap element and the matching flap, with the first and second catch mechanisms having a disabled state for releasing the flap element and the matching flap to oscillate between and open position and a blocked position and an activated state holding the flap element and the matching flap in one of an open position allowing fluid flow and a blocked position stopping fluid flow.

9. The fluid valve of claim 5, wherein the electrostatic flap is positioned in the flap element.

10. The fluid valve of claim 8, wherein the electromagnet is defined in the flap element.

11. The fluid valve of claim 1, wherein fluid ejected from the valve is directed against an object to control position of the object.

12. The fluid valve of claim 1, wherein the object is paper.

13. The fluid valve array system of claim 11, wherein fluid directed against the object is air.

14. The fluid valve of claim 1, further comprising a marking reservoir having marking agents, and wherein fluid directed against objects contains marking agents.

15. The fluid valve array system of claim 14, wherein the marking agents are liquid droplets.

16. The fluid valve array system of claim 14, wherein the marking agents are solid particles.

17. A fluid valve comprising
    a valve chamber supporting fluid flow, the valve chamber having an inlet and an outlet,
    an flap element and a matching flap positionable in the valve chamber to periodically block the outlet in response to periodic induced pressure differentials exerted against the flap element and the matching flap in response to fluid flow between the flap element and the matching flap, and
    a catch mechanism for controllably latching the flap element in one of an open position allowing fluid flow and a blocked position stopping fluid flow.

18. The fluid valve of claim 17, wherein the catch mechanism further comprises an electrostatic plate.

19. The fluid valve of claim 17, wherein the catch mechanism further comprises an electromagnet.

* * * * *